United States Patent [19]

Knowlton

[11] 4,261,018
[45] Apr. 7, 1981

[54] PROGRESSIVE IMAGE TRANSMISSION

[75] Inventor: Kenneth C. Knowlton, Plainfield, N.J.

[73] Assignee: Bell Telephone Laboratories, Incorporated, Murray Hill, N.J.

[21] Appl. No.: 49,417

[22] Filed: Jun. 18, 1979

[51] Int. Cl.³ .......................... H04N 1/00; G01T 1/29
[52] U.S. Cl. ................................... 358/263; 358/260; 358/133; 364/515
[58] Field of Search ............... 358/260, 261, 263, 133; 340/345, 146.3 R; 364/515

[56] References Cited

U.S. PATENT DOCUMENTS

| 3,609,670 | 9/1971 | Knowlton | 364/300 |
| 4,103,287 | 7/1978 | Frank | 358/260 |

OTHER PUBLICATIONS

Handbook, H. Hamsher, "Facsimile," *Comm. Systems Eng. Handbook,*"1967, pp. 2–67.
S. Tamimoto et al., "A Hierarchical Data Structure for Picture Processing," Comp. Graphics and Image Proc.

*Primary Examiner*—Jin F. Ng
*Assistant Examiner*—Edward L. Coles
*Attorney, Agent, or Firm*—Joseph P. Kearns

[57] ABSTRACT

An image composed of binary black and white picture elements (pixels) is progressively transmitted over a narrow-band channel after binary values of all pixels have been formatted into a hierarchical structure of subdivisions of successive halvings from the entire image down to cells of pixels of uniform size and shape. Each formatted value is encoded in accordance with whether the pairs of values from which it is derived are both black, both white or mixed. Transmission of the hierarchical values involves sending the primary value representing an overall midgray mixed value, and following with successively split image values so that the entire image is reconstructed at a remote receiver in progressively finer detail down to cell size. Final resolution, when needed, results from decoding a variable length code for the permutational patterns of pixels within cells in accordance with their probabilities of occurrence. Areas once deemed monotone are complete and are subsequently skipped by both transmitter and receiver.

9 Claims, 25 Drawing Figures

PROGRESSIVE IMAGE TRANSMISSION

FIELD OF THE INVENTION

This invention relates to the transmission of pictorial images over narrow-band transmission channels in general and, in particular, to two-dimensional black-and-white, i.e., binary, encoding of picture elements to facilitate the display of progressively better approximations of ultimate image details at a remote receiver location.

BACKGROUND OF THE INVENTION

In my prior application, Ser. No. 942,599 filed on Sept. 15, 1978, now U.S. Pat. No. 4,222,076, there were disclosed apparatus and method for encoding, transmitting and reconstructing gray-scale pictures by a hierarchical scheme of successive binary splittings of image space. At each hierarchical level gray values were rendered as useful approximate representations of the overall image in progressively finer detail. It was thus possible to reproduce the original image exactly in a progressive manner rather than in line-by-line fashion without paying any penalty in number of bits transmitted. Due to the early recognition of the nature of an image progressively transmitted, a degree of compression of time was realized when browsing through a series of images.

With images whose ultimate picture elements or pixels are simply white or black, herein called binary, compression of transmission time becomes an important consideration because there are typically large monotone background areas. Representative compression ratios using sophisticated blob encoding techniques, such as have been disclosed by A. J. Frank in U.S. Pat. No. 4,103,287 issued July 25, 1978 and entitled "Variable Length Codes for High Quality Image Encoding", are in the range of ten or twenty to one. This means that the number of encoding bits required to specify an image is only five to ten percent of the number of pixels in the image space. The Frank method achieves high compression ratios by identifying and stating the positions of "blobs" of monotone material and then encoding only the location of the leading and trailing edges, thereof, in each scan line. The total image is transmitted and reconstructed either blob by blob or in one top-to-bottom scan which develops blobs on the same level in parallel.

What is desired is a progressive picture display which at the same time achieves a significant compression. The basic advantage of progressive display of binary pictures over line-by-line display is that in early stages of reconstruction one sees the entire image in crude form, instead of seeing only the top part in final form.

SUMMARY OF THE INVENTION

According to this invention, a transmitter accepts a complete raster-scan binary image and processes it into nodes of a binary tree, where higher nodes correspond to larger and larger picture subdivisions, and finally sends to a remote receiver, at an available transmission rate, the information in the tree from top to bottom. At the receiver the image is progressively developed and displayed, first in crude form as information about the larger subdivisions is received, and thereafter progressively in finer detail as information defining lower nodes in the tree (corresponding to finer picture subdivisions) is received.

Illustratively, the transmitter process consists first of grouping scanned pixel information into cells of uniform numbers and shape and counting the number of like, say black, pixels per cell; second, at the next higher level noting only that the group is monotone black (i.e., all pixels are black), monotone white or mixed; and at successive higher levels noting that each corresponding pair is either "both elements solid black", "both elements solid white" or mixed, until a single apex node is reached. Image transmission of the remote receiver proceeds from the top of the tree down to the cell level, to cause the receiver to reconstruct the image progressively by alternately splitting rectangular areas vertically and horizontally, with the provision that once a subdivision is determined to be all-black or all-white, no further information about that area needs to be encoded or transmitted. Finally, only those areas that have not been resolved into monotone black or white need be involved in the final resolution of cells into individual pixels. In many cases sufficient resolution will have been achieved through alternate halvings that it will not be necessary to reduce gray shades to the pixel level.

Transmission can be stopped at any intermediate progression level when sufficient definition short of final definition is achieved.

BRIEF DESCRIPTION OF THE DRAWINGS

A better understanding of this invention may be had from a consideration of the following detailed description presented by way of example, with reference to the accompanying drawings, in which.

DETAILED DESCRIPTION

Figure 1:
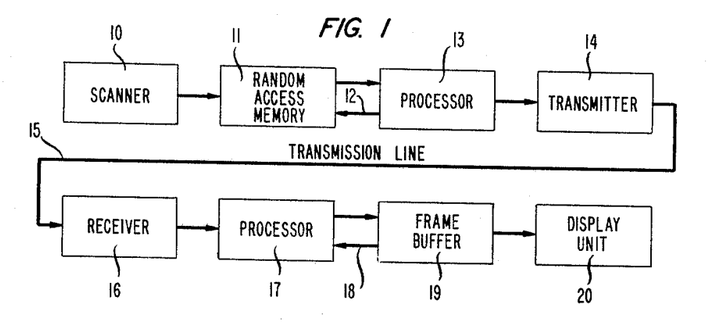
FIG. 1 is a block diagram of a representative graphics display transmission system.

FIG. 1 is a block diagram of an image scanning and transmission system suitable to the practice of this invention which comprises scanner 10, random-access memory (RAM) 11, processor 13 for scanned information, transmitter 14, transmission line or medium 15, receiver 16, processor 17 for received picture information, frame buffer 19 and video display unit 20.

Scanner 10 provides an electronic scanner spot, by way of example, which moves line-by-line in a horizontal direction during a slower downward sweep. Picture elements brightnesses are determined, by photoelectric means, to be either above or below some intermediate threshold value; these values are stored digitally in RAM 11. Binary values can be stored either sequentially in memory 11 or in preprogrammed locations which facilitate progressive image transmission.

Binary values are stored for each pixel. As a first step, processor 13 arranges individual pixels into cells of uniform size and shape. These cells are coded both in a fine fashion according to the positions of black and white pixels and in a coarse fashion according to the number of pixels, without regard to position, of a particular type, say white.

Both coarse and fine codes are entered back into RAM 11 over lead 12, the fine code forming the base level of a hierarchical tree and the coarse code the level just above the base level. Subsequent levels of the tree form their nodes by pairing elements of the next lower level according to whether they are both black, both white or mixed, i.e., one black and one white. Thus a variable length code of only one or two bits per codeword is required for any node in the tree except the bottom two levels.

Computer-controlled scanning apparatus capable of implementing scanner 10, memory 11 and processor 13 in FIG. 1 is commercially available from Cromemco, 280 Bernardo Ave., Mountain View, Cal. 94040, as the Z2D System. This system includes 64,000-bit random access memories (64K RAMs) and a Z80 microcomputer with input and output buses.

The functions of scanner 10, memory 11 and processor 13 take place at normally rapid scanning and computing speeds without regard to bandwidth of the transmitting channel. However, where the channel available has only voiceband capabilities, for example, image information can be transmitted at very slow rates measured in only thousands of bits per second rather than millions. Accordingly, the processed data in RAM 11 is fitted to the transmission characteristics of transmission line 15, whether by amplitude, frequency, phase or time modulation, in transmitter 14. There exist a variety of commercial data modems on the current market of which Western Electric Type 208B provides two-way operation at an acceptable forward transmission speed of 4800 bits per second, as well as a reverse channel for circuit assurance.

At receiver 16 the modulated bits encoding the information being transmitted are restored to baseband by appropriate conventional means. Processor 17 then operates on the restored bits to reconstruct an on-off beam pattern for display unit 20 through the medium of frame buffer 19. Effectively, frame buffer 19, to which access to processor 17 is provided over lead 18, furnishes timing and deflection control to display unit 20 in a conventional manner.

A graphics display system suitable for implementing processor 17, frame buffer 19 and display unit 20 is commercially available from Matrox International Corporation of Montreal, Canada (U.S. Agent, Matrox of Mooers, N.Y. 12958), as Model ALT-256.

By working down from the top of the binary tree, as defined hereinafter, with the information transmitted from processor 13, the desired image is reconstructed in crude form first—an intermediate gray level—and then successively in halves, quarters and smaller subdivisions until each binary pixel is reproduced in its correct position.

The scheme here proposed is less complex than that disclosed in my aforementioned patent application, but nevertheless is capable of transmitting the image in a progressive fashion with fewer bits than are needed for pixel-by-pixel transmission. Whereas my prior disclosure permitted progressive transmission of an image in exactly the number of bits required for straightforward pixel-by-pixel transmission, the present disclosure provides progressive transmission of binary images in as little as one-eighth the number of bits required for pixel-by-pixel transmission, i.e., a compression ratio up to eight to one is achieved.

Figure 2:
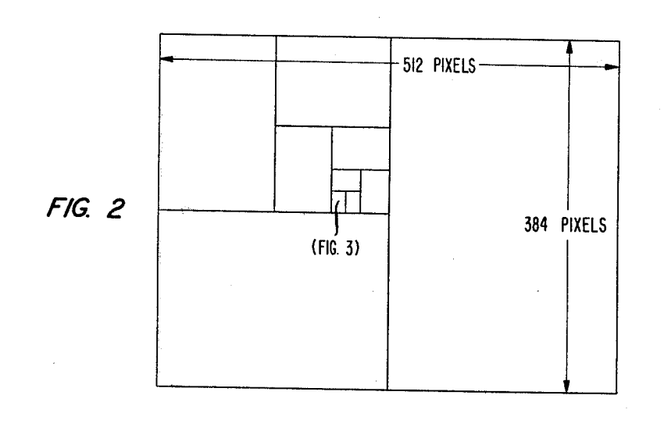
FIG. 2 is a diagram illustrating successive subdivision of a binary image to facilitate progressive transmission thereof.
Figure 3:
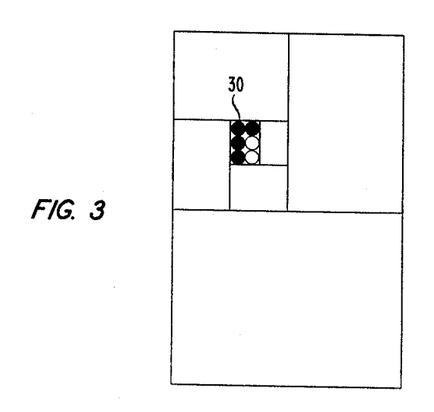
FIG. 3 is another diagram illustrative of the resolution of a binary image into ultimate pixels beyond successive binary subdivisions.

FIG. 2 is illustrative of the binary splitting process employed in this invention. In the interests of specificity and because of ready amenability to hierarchical subdivision a particular size of binary (black and white) image comprising 384 horizontal lines of 512 pixels per line for a total of 196,608 pixels is specified. The initial image reconstructed at the receiver is a midgray area of the prescribed dimensions. The next image is a vertical split of the overall area into left and right halves. The third split divides each vertical half horizontally into upper and lower quarters. Such a split is shown in the left half of FIG. 2. The matching split in the right half is not shown to avoid cluttering the drawing. Successive alternate vertical and horizontal splits continue into FIG. 3 until a small cellular, or "sextuple", area 30 containing six pixels each in a 2-wide by 3-high array is attained.

In any or all of these splittings the area may be all white, all black or mixed and can be simply coded by a Huffman code in which the codeword "O" suffices for the most frequently occurring, i.e., the mixed, case. Thus, the code for all areas larger than the cell is specified as:

0 mixed
10 solid black
11 solid white

Figure 5:
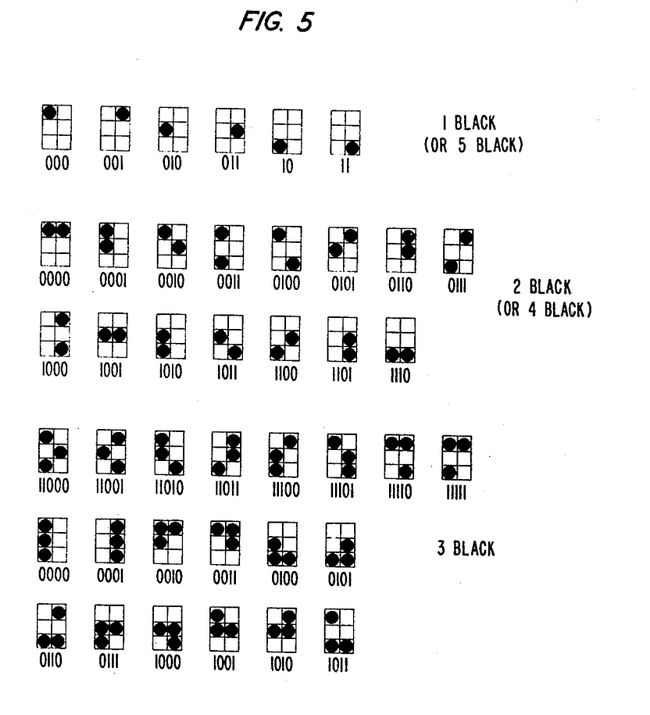
FIG. 5 is a diagram showing how fixed size groups of pixels can be digitally encoded according to several permutations of black and white pixels.

At the cell level mixed cells are further coded as one of five levels of gray, based on the number of black pixels occurring in a group of six pixels and the probabilities of their occurrences:

00 2 black pixels
01 3 black pixels
10 4 black pixels
110 1 black pixels
111 5 black pixels For the final resolution of the pixel position pattern, where the ultimate picture is required to be reconstructed, a further code, as suggested in FIG. 5, is appropriate. Here, sextuples with either one or five black pixels, of which there are only six of each, are readily encoded by at most three bits each as shown. Similarly, codes for two, three and four black pixels can be developed as further shown. There are fifteen possible permutations of two blacks and four blacks, and twenty permutations of three blacks.

The one-black permutations are distinguished from the five-black permutations by the group level code, which would be a prefix code, in effect, at the receiver. (The prefixes are all transmitted first to achieve the next-to-last picture approximation).

Figure 4:
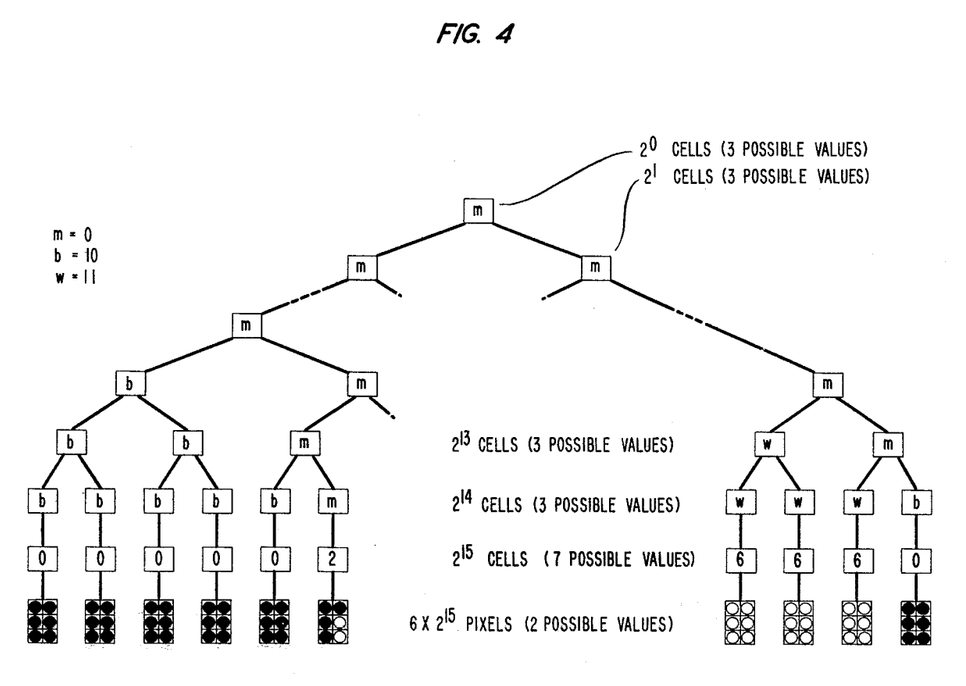
FIG. 4 is a binary tree representation of the hierarchical structure of encoded subdivisions extending down to ultimate cells of pixels.

FIG. 4 shows the binary tree of coded values constructed from the bottom up at the transmitter. The bottom layer contains all the sextuples first developed in processor 13 in FIG. 1. In the exemplary image there are $2^{15}=32,768$ sextuples. For purposes of constructing the upper levels of the tree each sextuple is translated into one of seven possible binary numbers from 0 for no white pixels, 1 for one white pixel and on to 6 for six white pixels. Each of these values if paired with a neighbor to form a node in the tree with one of three possible values as previously noted. Nodes of higher levels result from similar pairings and represent successively larger image areas. At the apex of the tree is a single node representing one of three values for the complete image. All the node values are stored in RAM 11 prior to transmission. The receiver first receives a coded signal corresponding to a single midgray value for the overall image. Next the receiver decodes two values corresponding to the shading of the left and right image halves. Next again each of these left and right halves is divided into upper and lower areas. As splitting continues in this fashion, some subdivisions are resolved into monotone black or white. Thereafter, no transmission time is required to delineate further subdivisions and transmission of information from such nodes is skipped. As the picture progressively develops at the receiver, it is depicted in black, white and midgray for those areas known to be all black, all white and "mixed", respectively. At the fifteenth level from the top all but the final sextuple-cell patterns have appeared at the receiver.

Figure 6:
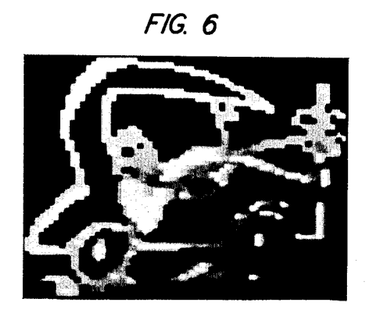
FIGS. 6, 7, 8, 9, 10 and 11 represent a sequence of progressive images developed through successive transmission levels of a binary tree.
Figure 7:
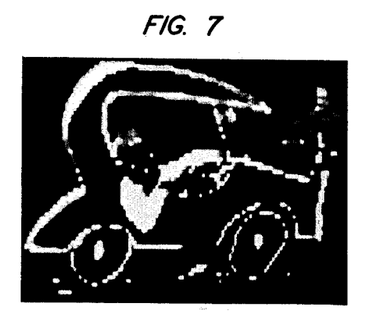
Figure 8:
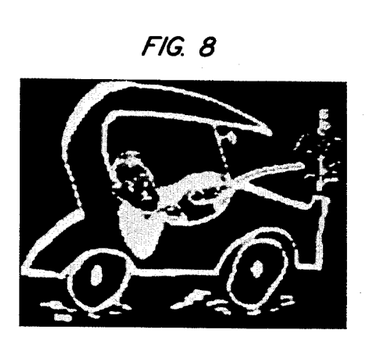
Figure 9:
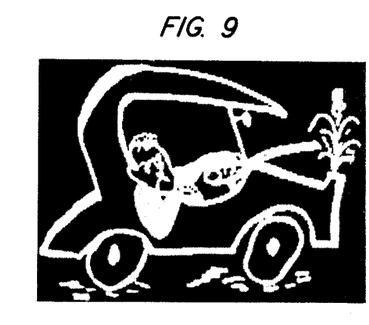
Figure 10:
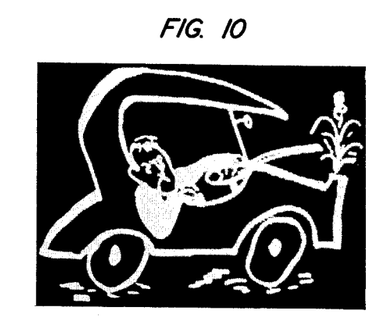
Figure 11:
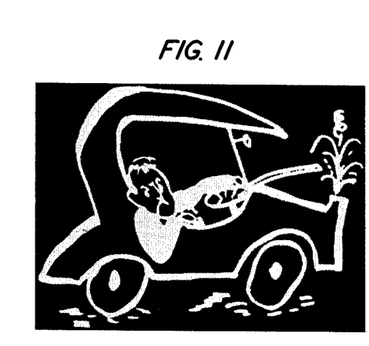
Figure 12:
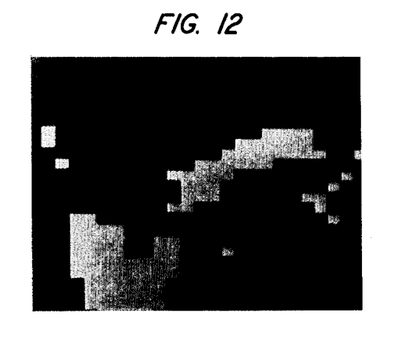
FIGS. 12, 13, 14, 15, 16 and 17 represent closeups of the centers of picture development shown in FIGS. 6, 7, 8, 9, 10 and 11 respectively.
Figure 13:
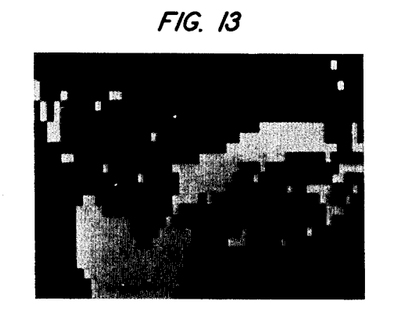
Figure 14:
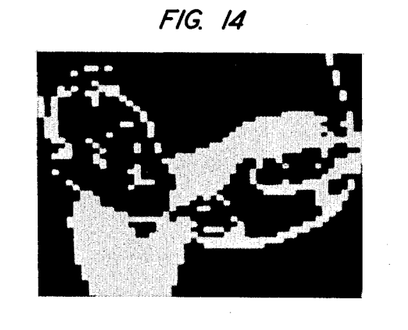
Figure 15:
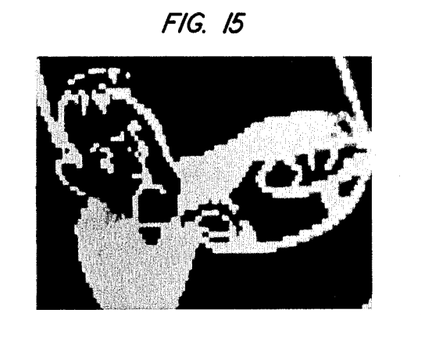
Figure 16:
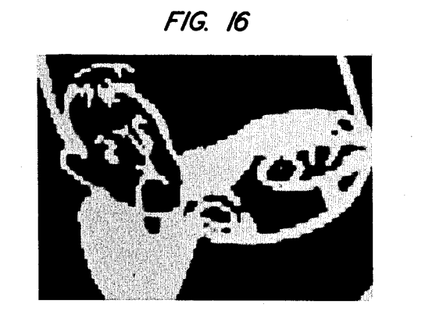
Figure 17:
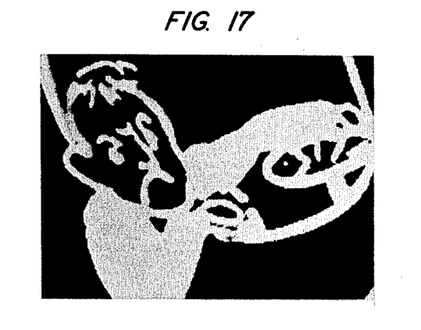
Figure 18:
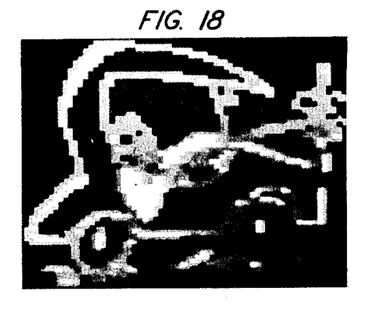
FIGS. 18, 19, 20 and 21 represent four stages of progressive development of a black and white image according to this invention.
Figure 19:
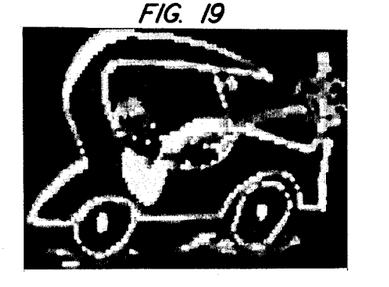
Figure 20:
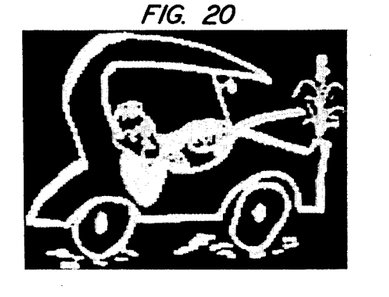
Figure 21:
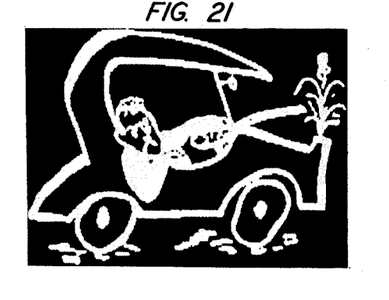
Figure 22:
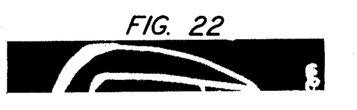
FIGS. 22, 23, 24 and 25 represent four stages of blob-encoded line-by-line transmission of the same image progressively transmitted in FIGS. 18, 19, 20 and 21.
Figure 23:
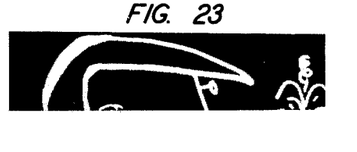
Figure 24:
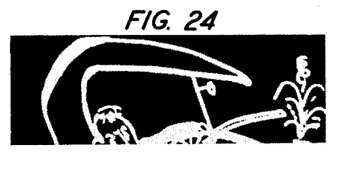
Figure 25:
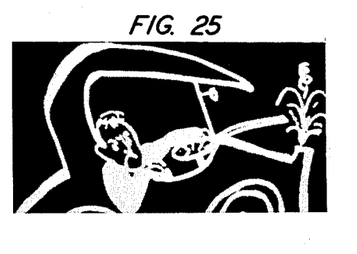

FIGS. 6 through 11 show the twelfth through seventeenth stages of reconstruction of a binary image of a driver in an antique automobile. FIG. 6 represents the stage of progression reached after the twelfth level of the binary tree of FIG. 4 has been received and decoded at the receiver. The time elapsed since the beginning of transmission is approximately one second, assuming a 4800 baud transmission rate. FIGS. 7 through 9 represent the stages of progression attained after the respective thirteenth through fifteenth level of the binary tree of FIG. 4 have been transmitted to form black, white and midgray approximations. The elapsed transmission times are approximately 1.6, 2.7 and 4.0 seconds, respectively. FIG. 10 represents the seven-value picture where minimum cell size corresponds to the sextuple groups. Finally, FIG. 11 represents the fully detailed reconstruction of the original in black and white pixels.

FIGS. 12 through 17 show enlargements of the central portions of the stages shown in FIGS. 6 through 11. These figures clearly show how the images increase in definition as the rectangular areas are subdivided into smaller and smaller subareas.

As is apparent from a consideration of FIGS. 6 through 11 the binary images develop in an agreeable way and provide a partial understanding of the subject matter during the process. This understanding in most practical cases will be complete enough before full resolution is achieved that in browsing through a long series of images considerable time will be saved in being able to abort transmission confidently of those images not incorporating the particular subject matter being searched.

The final coding of the sixteenth and seventeenth progressions, as shown in FIGS. 10 and 11, can be made more efficient using a coding based on probabilities. The simple coding previously described provides compression ratios on the order of six to one in comparison with line-by-line transmission.

A code based on probabilities can be developed by taking into consideration what is known about the environment. For example, if a cell to be split is surrounded by solid black cells, then one or the other of its parts is likely to be solid black or possibly mixed, but neither is likely to be solid white. As a consequence, a code of shorter average length than otherwise can be devised. Furthermore, if a sequence of two very likely probabilities occur, then a short code can be developed to transmit this sequence as though it were a single event. A "complete" code can be generated by cataloging simultaneous and sequential occurrences in a way that the total number of bits needing transmission can be significantly reduced to result in compression ratios on the order of eight to one. FIGS. 18 through 21 are duplicates of FIGS. 6 through 9 and show the progressive increase in definition as more levels of the binary tree of FIG. 4 are received and decoded at a remote terminal. Next to FIGS. 18 through 21 are shown the corresponding images obtained in equivalent transmission times, i.e., bit counts by the line-by-line blob encoding method of A. J. Frank. Although the blob method provides full definition of partial images from the beginning, the entire image is not seen until full development is reached. The transmission times corresponding to respective FIGS. 18 and 22, 19 and 23, 20 and 24 and 21 and 25 are 0.8, 1.3, 2.2 and 3.2 seconds at a transmission rate of 4800 bits per second and an eight-to-one compression ratio.

While this invention has been described in terms of a specific illustrative embodiment, those skilled in the art will appreciate that many modifications are possible within the spirit and scope of the appended claims.

I claim:

1. An image transmission system (FIG. 1) including at a transmitting terminal a scanning and digitizing device (10), an addressable memory (11) for storing binary values corresponding to each picture element in an image to be transmitted and a signal processor (13) characterized in that the processor (13) at said terminal first encodes cells of binary values provided to said memory (11) by said scanning device (10) representing basic image areas of uniform size and shape according to the number of picture elements of a predetermined binary kind therein and next forms a multilevel hierarchical tree with nodal values derived from a comparison of pairs of such values on lower levels until a single value on the top level is reached according to whether the members of a pair being compared are both black, both white or mixed, each nodal value representing the shade of an equal-area subdivision for each level of said tree.

2. The image transmission system defined in claim 1 further characterized in that said processor (13) further encodes numerically said basic image areas of uniform size and shape according to the distribution pattern of picture elements of one kind therein.

3. The image transmission system according to claim 1 characterized in that processor (13) further encodes each cell of picture elements according to the permutational pattern of binary values therein and in which processor (17) reconstructs when required as a final progression the individual binary value of each picture element in the cells.

4. The image transmission system of claim 1 further characterized in that the receiving terminal includes a frame buffer (19) for controlling the beam characteristics of said display device (20) in accordance with the nodal values decoded by the processor (17) thereat.

5. The image transmission system defined in claim 1 further characterized in that said processor (13) at the transmitting terminal further encodes numerically said basic image areas of uniform size and shape according to the distribution of picture elements of one kind therein, and said processor (17) at the receiving terminal further decodes numerical values corresponding to the distribution of picture elements of one kind in basic image areas into positions of individual picture elements therein.

6. The image transmission system (FIG. 1) including at a receiving terminal an image display device (20) and a signal processor (17) characterized in that said processor (17) decodes nodal values of a hierarchical tree from a single apex value, corresponding to an overall image gray value, through each lower level, corresponding to successive halvings of higher image areas, and causes said display device (20) to reconstruct a transmitted image in progressively finer detail until transmission is stopped at any level or is continued to completion.

7. The image transmission system defined in claim 6 further characterized in that processor (17) decodes picture-element groups of uniform size and shape according to a permutational pattern of binary values in each cell and reconstructs in a final progression the individual binary value of each picture element of an original image.

8. An image transmission system (FIG. 1) including at a transmitting terminal a scanning device (10), an addressable memory (11) for storing black and white binary values corresponding to each picture element of an image to be transmitted, a transmission channel (15) for such image, at a receiving terminal an image display device (20) and at each of such transmitting and receiving terminals of signal processor (13,17) characterized in that a processor (13) at the transmitting terminal first encodes cells of binary values from said memory (11) representing basic image areas of uniform size and shape according to the number of picture elements therein of a predetermined binary kind and next forms a multilevel hierarchical tree with nodal values derived from a comparison of pairs of such values on lower levels until a single value on the top level is reached according to whether the members of a pair are both black, both white or mixed, each nodal value representing the shade of an equal-area subdivision for each level of such tree;

the transmitter (14) sends the nodal values level-by-level over said channel (15) beginning with said single top level value but skips any white or black value repeated to a lower level; and the processor (17) at a receiving terminal decodes nodal values received over said channel (15) from the single topmost value, corresponding to the overall image shade, of the hierarchical tree through each lower level causing said display device (20) to reconstruct the transmitted image in progressively finer detail until transmission is stopped at any level or is continued to completion.

9. In an image transmission system (FIG. 1) including at a transmitting terminal a scanning device (10), an addressable memory (11) for storing black and white binary values corresponding to each picture element of an image to be transmitted, a transmission channel (15) for such image at a receiving terminal, an image display device (20), and at each of such transmitting and receiving terminals a signal processor (13,17) the method for coding and decoding picture element information for progressive transmission over such channel characterized in that in a first step processor (13) interactively with memory (11) forms picture elements into cells of uniform size and shape;

in a second step counts the number of picture elements of a predetermined binary kind in each group:

in a third step forms the base of a multilevel hierarchical tree from nodal values derived from a comparison of pairs of numbers in adjacent cells of the second step, said nodal values being both alike of one binary kind, both alike of the other binary kind, or mixed;

in a fourth step forms the remaining levels of the hierarchical tree from nodal values of lower levels according to the same code until a single value at the apex of the tree is reached, said nodal values being such that areas once determined to be all of one binary kind need not be further subdivided;

in a fifth step transmits the nodal values level by level through said transmission channel; and in a sixth step in said processor (17) at receiving terminal interactively with said display device (20) decodes received nodal values from the apex value corresponding to the overall image shade through the nodal values of each lower level and reconstructs the transmitted image in successively finer detail until transmission is stopped at any level or continued to completion.

* * * * *